United States Patent Office 3,070,596
Patented Dec. 25, 1962

3,070,596
1,1'-BIAZIRIDINE COMPOUNDS AND THE PROCESS OF PREPARATION
Allen F. Graefe, Pomona, and Ralph E. Meyer, Sacramento, Calif., assignors to Aerojet-General Corporation, Azusa, Calif., a corporation of Ohio
No Drawing. Filed Mar. 23, 1959, Ser. No. 801,388
14 Claims. (Cl. 260—239)

This invention relates to new 1,1'-biaziridine compositions of matter and to a method of preparing them. The new compositions of this invention conform to the following general formula:

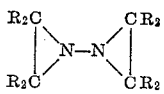

wherein each R is an alkyl or a hydrogen radical. These compounds find valuable use as propellants and as rocket fuels in liquid bi-propellant rocket systems.

Certain fuels have been found to be capable of high thrust and therefore useful as propellant fuels. Among these fuels are hydrazine, ammonia, liquid hydrogen, unsymmetrical dimethylhydrazine and monomethylhydrazine. Each of these fuels while capable of producing the desired thrust, nevertheless possesses certain undesirable physical properties insofar as utility as a propellant fuel is concerned.

Our novel compositions are possessed of relatively high densities by comparison with unsymmetrical dimethylhydrazine or monomethylhydrazine, hereinafter abbreviated as UDMH and MMH, respectively, and as those skilled in the art realize, increased density makes for higher specific impulse.

Ammonia must be handled as a condensed gas under refrigeration, and hydrazine exhibits an undesirably high freezing point (2° C.). The novel compounds of this invention, on the other hand, do not possess these drawbacks. The unique structure of our new compounds, combining the features of two strained 3-membered rings as well as a hydrazine function, impart properties to the material which render it a highly reactive fuel thus making it valuable for use as the fuel constituent of a bipropellant rocket system such as is described on pages 763 and 766–772 of vol. 11 of the "Encyclopedia of Chemical Technology," Kirk and Othmer, Interscience Publishers, Inc., New York, N.Y. (1953), and can be used with conventional oxidizers such as liquid oxygen, fuming nitric acid and the like.

Our new 1,1'-biaziridine compounds can be mixed with other fuels with which they are miscible to obtain useful propellant mixtures. For example, the 1,1'-biaziridines are miscible with UDMH and MMH and they can thus be blended with either of these fuels to yield a mixture of higher density than UDMH or MMH alone.

The novel compositions of this invention are prepared by reacting an alkali metal aziridine with a 1-haloaziridine, at a reduced temperature, in accordance with the reaction scheme set forth below:

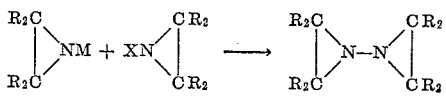

wherein M is an alkali metal radical, X is a halogen radical and R is as defined above.

The alkali metal aziridine of the above reaction is prepared by reacting a suitable cyclic imine, such as ethylenimine, with an alkali metal substituted alkane such as methyllithium, according to the method of Gilman et al., described in the J. Am. Chem. Soc., 67, 2106 (1945).

The 1-haloaziridine can be prepared by reacting a suitable cyclic imine, such as ethylenimine, with an alkali or alkaline earth metal hypohalite, as more fully disclosed in assignee's copending U.S. patent application, Serial No. 479,658, filed January 3, 1955, now U.S. Patent 2,944,051.

Following are examples intended to illustrate the method of preparing our novel compositions. These examples are intended for illustrative purposes only and hence should not be construed as limiting the invention to the particular conditions and materials set forth therein.

EXAMPLE I

*The Preparation of 1-Chloroaziridine*

A solution of 92.4 g. (2.20 moles) of sodium hydroxide pellets (assay 97%) in 385 g. of water was maintained at −5 to −10° while 80.3 g. (1.1 moles) of chlorine was introduced. The addition of chlorine was followed by a gain in weight of the solution. To the resulting hypochlorite solution 43.0 g. (1.00 mole) of cold (−10°) ethylenimine was added rapidly with swirling. The crude 1-chloroaziridine separated as a colorless upper layer, with the simultaneous decoloration of the hypochlorite solution. The layers were separated, and the organic layer was washed with 30-ml. portions of distilled water until the washings were no longer basic (four to six washings required). The product was dried over anhydrous magnesium sulfate and was then distilled at reduced pressure through a 12 in. column packed with glass helices. The 1-chloroaziridine, which distilled at 37.5° to 38.3° at 245 mm., was a mobile, colorless, strongly lachrymatory liquid, $n^{20}D$ 1.4433, $d^{24}$ 1.11 g./ml., immiscible with water and miscible with ethanol and organic solvents. The yield was 80% of the theoretical, based on ethylenimine. The elemental analysis of the product was as follows:

| | Percent C | Percent H | Percent N | Percent Cl |
|---|---|---|---|---|
| Calcd. for $C_2H_4NCl$ | 30.99 | 5.20 | 18.07 | 45.74 |
| Found | 30.98 | 5.13 | 18.09 | 45.72 |

An analysis for positive halogen was carried out by dissolving the compound in ethylene chloride, adding excess potassium iodide, acidifying with glacial acetic acid, and titrating the liberated iodine with standard sodium thiosulfate; found, Cl, 45.69.

EXAMPLE II

*Reaction of 1Chloroaziridine With 1-Lithiumaziridine*

Six liters of ether was cooled to −50°, and 990 g. (12.79 moles) of 1-chloroaziridine in 5 liters of ether was added dropwise with stirring simultaneously with an ethereal suspension of 1-lithiumaziridine (prepared from 7 liters of 1.83 M ethereal methyllithium (12.79 moles of methyllithium) and 550 g. (12.79 moles) of ethylenimine in 5 liters of ether). The reaction mixture was maintained at about −50° during the 3.5 hours addition period. Too rapid addition or a higher reaction temperature had been found to result in the formation of a brown color, with attendant loss in yield of product. The reaction mixture was allowed to warm to room temperature overnight, and the solution was filtered by withdrawal through a coarse filter stick. The light-yellow ether filtrate contained no appreciable amount of the desired product, as determined by the titration of an acidified aliquot with standard potassium iodate, and was discarded. The yellow-orange solid was washed four times with 1.5 liter portions of ether. The solid was decomposed by addition to 8.5 liters of ice-water, and an ether layer which separated at this point was set aside for combination with the ether extracts to be obtained later in the workup. Analysis of an aliquot of the aqueous solution with standard potassium iodate indicated a maximum yield of 1,1-biaziridine of 2.56 moles or 20%.

The separation of 1,1'-biaziridine as a crude oil from the water solution was effected by the portionwise addition of 10 lb. of powdered potassium carbonate. The temperature was maintained in the range 25 to 35° by external cooling during the salting-out process. Both the aqueous layer and the black oil which separated were extracted several times with ether (9.5 liters total). The combined ether extracts, which contained a maximum of 15.7% (2.01 moles) of the theoretical amount of 1,1'-biaziridine, (of which three-fourths came from the oil), was dried over anhydrous potassium carbonate and then flash-distilled.

The clear, colorless distillate contained, in addition to a maximum of 2.01 moles of 1,1'-biaziridine, a maximum of 2.10 moles of ethylenimine. That ethylenimine was present in the distillate at this point was shown in another run, in which direct fractionation of the dry ethereal extracts (see above paragraph) afforded a fraction, B.P. 54.6 to 54.9° (749 mm.), which was determined to be nearly pure ethylenimine on the basis of its boling point (lit. 56°), specific gravity, 0.836 (lit. 0.832), acid equivalence (93.6% of the theoretical for ethylenimine), and infrared spectrum (identical with that of pure ethylenimine). That a maximum of 2.10 moles of ethylenimine was present in the ethereal solution in the present run was shown by titartion with standard acid.

EXAMPLE III

Recovery of 1,1'-Biaziridine

The ethereal solution containing 1,1'-biaziridine, ethylenimine and residual water was passed repeatedly through a vertical column packed with 14.8 lb. of molecular sieve pellets until the ethylenimine (and water) had been removed completely, as determined by acid titration. The molecular sieve employed was Linde Molecular Sieve, Type 4A, a pelleted sodium alumino-silicate (1/16-in. pellets) product having a pore diameter of about 4 angstroms. The sieve was washed with additional ether to minimize loss of 1,1'-biaziridine. Only 5 to 6% of the 1,1'-biaziridine originally present in the ether solution was lost during the removal of ethylenimine in this manner. Ether was removed from the solution by distilling through a perforated plate column (reflux ratio, 1.5:1) until the 11 liters of solution had been reduced to a volume of 300 ml., and the residue was then fractionated through a 12-in. Widmer spiral column (reflux ratio, 10:1). After removal of additional ether, the following cuts were collected (data include percentage purity by titration with potassium iodate, calculated as 1,1'-biaziridine): I, B.P. 82.0–83.0° (750 mm.), 1.25 g., 96.3%; II, B.P. 83.0–83.2° (750 mm.), 119.3 g., $n^{20.9}$D 1.4387, 100.8%; III, B.P. 83.2–90.0° (750 mm.), 11.0 g., $n^{20.9}$D 1.4388, 99.6%; and IV, B.P. 90–98° (750 mm.), 1.0 g., $n^{20.9}$D 1.4365, 95.2%. Cut II was a colorless, mobile liquid freezing at −11°, $n^{28.6}$D 1.4356, $d^{24}$ 0.901 g./ml., net heat of combustion 710 kcal./mole, miscible with water, ethanol, methylhydrazine, benzene and hexane, and immiscible with hydrazine, yield 11.1% (from 1-chloroaziridine). This cut was found to be extremely explosive when heated in an oxygen atmosphere.

*Analysis of Cut II.*—Calcd. for $C_4H_8N_2$: C, 57.14; H, 9.52; N, 33.33; mol. wt., 84.12; MR, 24.83. Found for $C_4H_8N_2$: C, 56.90; H, 9.96; N, 33.12; mol. wt., 84.2 (cryoscopic in benzene), 84.5 (potentiometric with potassium iodate); MR, 24.39.

Proof of the structure of the 1,1'-biaziridine product was indicated by its strong absorption in the infra-red spectrum at 8.25 and 11.5μ, coupled with the fact that the intra-red spectrum indicated the absence of N-H bonding (at 3.0μ) and C=N bonding (at approximately 6.0μ).

When oxidized in 6 N hydrochloric acid solution with aqueous potassium iodate, the compound was found to undergo a six-electron change, which is characteristic of symmetrically disubstituted alkylhydrazines. The observed electron change is explained readily in terms of the usual acid-catalyzed ring opening of ethylenimine derivatives, in this case to form sym-bis-β-hydroxethylhydrazine

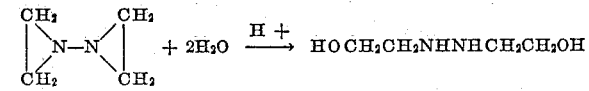

The calculated molar refraction of the compound is also in keeping with the assigned structure. A nuclear magnetic resonance spectrum indicated that all of the hydrogen atoms are equivalent. The method of preparation and these physical and chemical properties support the proposed 1,1'-biaziridine structure assigned to the compound.

The reaction temperature of our novel method should be kept relatively low to avoid the occurrence of side reactions. We have found that the reaction proceeds satisfactorily at a temperature of about −50° C. and that for best results the temperature should not exceed about −30° C.

The parent compound of our novel class of compositions, 1,1'-biaziridine, being the one of highest density, is preferred to the others as a propellant fuel from the standpoint of specific impulse. Because of its superior stability, 1-chloroaziridine is the 1-haloaziridine most satisfactory for use in preparing our parent compound and 1-lithiumaziridine is the preferred alkali metal aziridine because of its ready solubility in easily-obtained solvents such as ether.

It is highly desirable to conduct the reaction of our invention in appropriate solvents since otherwise the highly reactive nature of the starting materials would cause rapid reaction with attendant temperature rise accompanied by undesirable side reactions. Where 1-lithiumaziridine is a reactant, ethers such as ethyl ether, methyl ether, tetrahydrofuran, etc., should ordinarily be employed as solvents since 1-lithiumaziridine is soluble in these liquids. Solubility, at least to a certain extent, is necessary since without it the rate of reaction would be inordinately slow. Substantially inert solvents other than ethers, in which the reactants and products of this invention are substantially soluble, can of course be employed within the scope of the invention.

For best results air and moisture should be excluded, insofar as possible, from the reacting system of our invention. This is not a critical requirement, however, since the presence of oxygen merely has the effect of reducing the product yield. Our reaction is of such nature as to require reducing conditions and any oxygen present would obviously be detrimental to the yield of product.

It will be appreciated that many compositions within the scope of our invention can be prepared by reacting appropriate starting materials in accordance with the method taught herein. For example, 1-sodium-2-methylaziridine; 1-potassium-2-methyl-2-ethyl-3-propylaziridine; and 1-rubidium-bis (2,3-dimethyl)-aziridine react with 1-bromoaziridine; 1-iodo-2,3-dimethyl-3-ethylaziridine; and 1-fluoro-bis (2,3-dimethyl)-aziridine to yield monomethyl-1,1'-biaziridine; 2,2',3'-trimethyl-2,3'-diethyl-3-propyl-1,1'-biaziridine; and bis (2,3,2',3'-tetramethyl)-1,1'-biaziridine, respectively. Other 1,1'-biaziridines within the scope of our invention can be prepared by employing different starting materials in our novel method.

We claim:
1. As compositions of matter, 1,1'-biaziridine compounds of the formula:

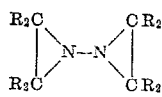

wherein each R is a member selected from the group consisting of lower alkyl and hydrogen radicals.

2. As a composition of matter, 1,1'-biaziridine of the structural formula:

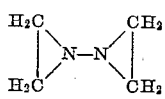

3. As a composition of matter monomethyl-1,1'-biaziridine of the structural formula:

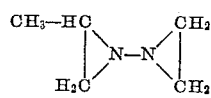

4. As a composition of matter 2,2',3'-trimethyl-2,3'-diethyl-3-proply-1,1'-biaziridine of the structural formula:

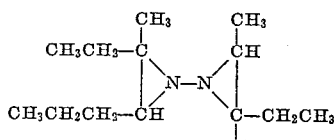

5. As a composition of matter bis(2,3,2',3'-tetramethyl)-1,1'-biaziridine of the structural formula:

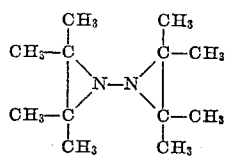

6. The method of preparing 1,1'-biaziridine compounds of the formula:

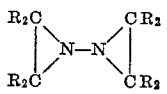

which comprises reacting an alkali metal aziridine compound having the formula:

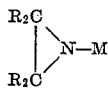

with a 1-haloaziridine compound having the formula:

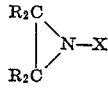

at a temperature below about −30° C., wherein each R is a member selected from the group consisting of alkyl and hydrogen radicals, M is alkali metal and X is halogen.

7. The method of preparing 1,1'-biaziridine which comprises reacting 1-chloroaziridine with 1-lithiumaziridine at a temperature below about −30° C.

8. The method of preparing monomethyl-1,1'-biaziridine which comprises reacting 1-sodium-2-methylaziridine with 1-bromoaziridine at a temperature below about −30° C.

9. The method of preparing 2,2',3'-trimethyl-2,3'-diethyl-3-propyl-1,1'-biaziridine which comprises reacting 1-potassium-2-methyl-2-ethyl-3-propylaziridine with 1-iodo-2,3-dimethyl-3-ethylaziridine at a temperature below about −30° C.

10. The method of preparing bis(2,3,2',3'-tetramethyl)-1,1'-biaziridine which comprises reacting 1-rubidium-bis-(2,3-dimethyl)-aziridine with 1-fluoro-bis(2,3-dimethyl)-aziridine at a temperature below about −30° C.

11. The method of preparing 1,1'-biaziridine which comprises reacting 1-chloroaziridine with 1-lithiumaziridine at a temperature of about −50° C.

12. The method of preparing 1,1'-biaziridine which comprises reacting 1-chloroaziridine with 1-lithiumaziridine in an ether at a temperature of about −50° C.

13. The method of preparing 1,1'-biaziridine compounds of the formula:

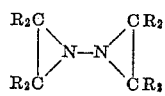

which comprises reacting an alkali metal aziridine compound having the formula:

with a 1-haloaziridine compound having the formula:

in a substantially inert solvent and at a temperature not greater than about −30° C., wherein each R is a member selected from the group consisting of alkyl and hydrogen radicals, M is an alkali metal radical and X is a halogen radical.

14. The method of claim 12 wherein the ether is ethyl ether.

References Cited in the file of this patent
UNITED STATES PATENTS
2,831,018    Trieschmann et al. _____ Apr. 15, 1958